United States Patent [19]
Kalopissis et al.

[11] 3,905,761
[45] Sept. 16, 1975

[54] COMPOSITION AND METHOD FOR DYEING KERATINOUS FIBERS

[75] Inventors: Gregoire Kalopissis, Paris; Andree Bugaut, Boulogne-sur-Seine; Francoise Estradier, Paris, all of France

[73] Assignee: Societe Anonyme dite: L'Oreal, Paris, France

[22] Filed: Oct. 30, 1972

[21] Appl. No.: 301,998

Related U.S. Application Data

[62] Division of Ser. No. 61,833, Aug. 6, 1970, Pat. No. 3,792,090.

[30] Foreign Application Priority Data

Aug. 11, 1969 Luxemburg.............................. 59265

[52] U.S. Cl. .............................. 8/10.2; 8/10; 8/10.1; 8/11; 8/32; 260/396 N; 260/571; 260/573; 424/DIG. 2; 424/70; 424/71; 8/11; 8/32
[51] Int. Cl.² ............................................ A61K 7/13
[58] Field of Search ........................................ 8/10.2

[56] References Cited
UNITED STATES PATENTS

| | | | |
|---|---|---|---|
| 2,013,394 | 9/1935 | Tolstoouhov ........................ | 260/575 |
| 2,895,826 | 7/1959 | Salminen et al. ........................ | 96/55 |
| 3,148,062 | 9/1964 | Whitmore et al. ........................ | 96/55 |
| 3,210,252 | 10/1965 | Blanke et al. .......................... | 8/10.2 |
| 3,617,163 | 11/1971 | Kalopissis et al. .................. | 8/10.1 X |
| 3,712,790 | 1/1973 | Kalopissis et al. ...................... | 8/10.2 |
| 3,792,090 | 2/1974 | Kalopissis et al. ...................... | 8/10.2 |

*Primary Examiner*—Stanley J. Friedman
*Assistant Examiner*—Dale R. Ore
*Attorney, Agent, or Firm*—Cushman, Darby & Cushman

[57] ABSTRACT

Diphenylamines having the formula

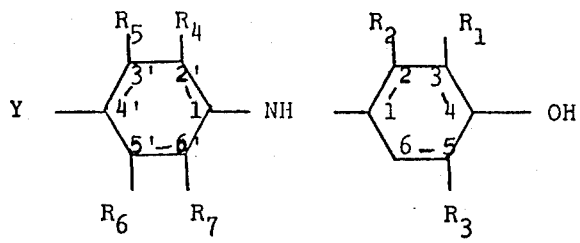

wherein: Y represents a member selected from the group consisting of a hydroxy and amino, $R_1$ and $R_3$, each independently, represent a member selected from the group consisting of hydrogen, halogen, lower alkyl, lower alkoxy, a ureido residue, and —NHCOR wherein R is lower alkyl, $R_2$ represents a member selected from the group consisting of hydrogen, halogen, lower alkyl, lower alkoxy, a ureido residue, —NHCOR wherein R is lower alkyl, and —NHR$_8$ wherein R$_8$ represents a member selected from the group consisting of hydrogen, lower alkyl, lower hydroxyalkyl and carbamylmethyl, with the proviso that when $R_2$ is —NHR$_8$, $R_3$ is not hydrogen $R_4$, $R_5$, $R_6$, and $R_7$ each independently represent a member selected from the group consisting of hydrogen, halogen, lower alkyl and lower alkoxy, with the proviso that when Y is hydroxy, $R_2$ is not hydrogen, halogen, lower alkyl or lower alkoxy, and that when Y is amino, at least two of $R_1$, $R_2$ and $R_3$ are other than a hydrogen and $R_2$ is not hydrogen when $R_4$, $R_5$, $R_6$ and $R_7$ are all hydrogen and the acid addition salts of said diphenylamines.

6 Claims, No Drawings

COMPOSITION AND METHOD FOR DYEING KERATINOUS FIBERS

This is a division of application Ser. No. 61,833, filed Aug. 6, 1970, now U.S. Pat. No. 3,792,090.

This invention relates to novel diphenylamines and a process for preparing the same and to novel cosmetic composition containing diphenylamines for dyeing keratinic fibers such as human hair. More specifically, the present invention relates to a method and a use of a novel diphenylamine having the formula:

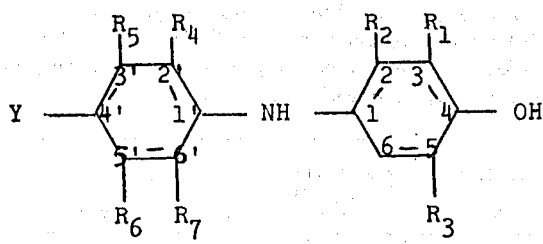

wherein: Y represents a member selected from the group consisting of hydroxy and amino, $R_1$ and $R_3$, each independently, represent a member selected from the group consisting of hydrogen, halogen, lower alkyl, lower alkoxy, ureido residue and —NHCOR group wherein R represents lower alkyl, $R_2$ represents a member selected from the group consisting of hydrogen, halogen, a lower alkyl, lower alkoxy, a ureido residue, —NHCOR wherein R represents lower alkyl and —$NHR_8$ wherein $R_8$ represents a member selected from the group consisting of hydrogen, a lower alkyl, lower hydroxy alkyl and carbamylmethyl, with the proviso that when $R_2$ is —$NHR_8$, $R_3$ is not hydrogen, $R_4$, $R_5$, $R_6$, $R_7$ each represent a member selected from the group consisting of hydrogen, halogen, lower alkyl, lower alkoxy, with the proviso that when Y is hydroxy, $R_2$ is not hydrogen, halogen, lower alkyl, or lower alkoxy radical, and that when Y is amino, at least two of the radicals $R_1$, $R_2$ and $R_3$ are other than hydrogen and $R_2$ is not hydrogen when $R_4$, $R_5$, $R_6$, $R_7$ are all hydrogen, and the addition of salts of said diphenylamines with organic or inorganic acids.

In the above definition the terms lower alkyl and lower alkoxy radicals designate groups containing from 1 to 4 carbon atoms.

The diphenylamines of the present invention can be prepared by reducing an indoaniline or an indophenol having the formula

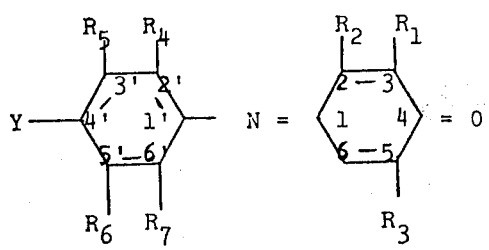

wherein $R_1$, $R_2$, $R_3$, $R_4$, $R_5$, $R_6$, $R_7$ and Y have the meanings given above in an alkaline medium having a pH ranging from about 9 to 12, and in the presence of effective amounts of a reducing agent selected from the group consisting of sodium hydrosulfite or an alkaline sulfide such as sodium or ammonium sulfide. The amount of reducing agent can vary but generally it will be present in amounts such that the mole ratio of indoaniline or indophenol being reduced to reducing agent ranges between 1:1.5 to 1:3. The reducing reaction is generally carried out at ambient pressure and at a temperature ranging from about 25° to 50°C.

The leucoderivatives of the present invention are colorless compounds which when applied in an aqueous medium to the fibers to be dyed, oxidize in the air or in the presence of added oxidizing agent, thereby yielding the corresponding indoanilines or indophenols, which are colored compounds and which are directly responsible for the coloring of the keratinic fibers. An important advantage of these leucoderivatives over their corresponding oxidation products are their increased solubility in an aqueous medium and hence their greater fiber penetrating characteristics. Because of these properties a better quality and a greater intensity of fiber coloring is attainable.

The applicants have also found that these diphenylamine leucoderivatives, as well as known diphenylamines of closely related structure, are advantageously employed in the preparation of capillary hair-setting lotions. Consequently, the present invention also has for its object the provision of a capillary hair-setting lotion, characterized by the fact that it contains in dilute lower alkanol solution having a titer ranging from about 50° to 80° at least one cosmetic resin and at least one compound having the formula:

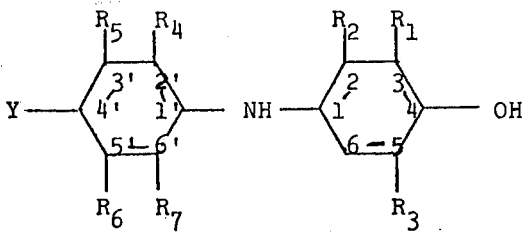

wherein Y, $R_1$, $R_3$, $R_4$, $R_5$, $R_6$ and $R_7$ have the meaning indicated above, and $R_2$ represents a member selected from the group consisting of hydrogen, halogen, lower alkyl, lower alkoxy group, a ureido residue, —NHCOR wherein R represents lower alkyl, and —$NHR_8$ wherein $R_8$ represents a member selected from the group consisting of hydrogen, lower alkyl, lower hydroxy alkyl and carbamylmethyl.

Representative cosmetic resins usefully employed in the present invention include polyvinylpyrrolidone having a molecular weight ranging from about 10,000 to 700,000, copolymers of crotonic acid-vinyl acetate, copolymers of vinylpyrrolidone-vinyl acetate wherein the ratio of VP to VA can range for instance between 50–70:50–30, copolymers of maleic anhydride-butylvinyl ether, and the like. These resins are generally used in the proportion of 1 to 3% by weight of the total composition.

The alcohols suitable for making said hair-setting lotions are lower alkanols, preferably ethanol or isopropanol. These alcohols are used in a proportion of 20 to 50% by weight of the total composition.

The hair-setting lotions according to the invention contain from 0.01 to 0.1% by weight of the diphenylamine leucoderivatives defined above, and have a pH between 7 and 10, and preferably between 7 and 9. The pH can be obtained by adding to the lotion an alkaline agent such as ammonia or triethanolamine.

The hair-setting lotion according to the invention is employed in a conventional manner by applying the same to previously washed and rinsed wet hair followed by rolling the treated hair on curlers and thereafter drying it.

The hair-setting lotions of the present invention make it possible to impart to the hair a remarkable coloring characterized by its uniformity and its brightness, without it being necessary to take particular precautions and regardless of the degree of sensitivity of the hair being treated. In particular, in the case of irregularly bleached hair the hair-setting lotions of this invention make it possible to obtain results that are quite hard to achieve by standard dyeing processes.

The coloring of the hair obtained, in addition to its qualities of uniformity and brightness, is also characterized by glints which is an additional quality highly prized by hair dyers.

Further, the hair-setting lotions of the present invention can also contain known leucoderivatives, particularly leucoderivatives of indamines.

The following examples are given to illustrate the present invention. Unless otherwise specified all parts and percentages are by weight.

EXAMPLE 1

3,5-dimethyl-4-hydroxy-4'-amino-3',5'-dimethyl-2'-methoxy-diphenylamine is prepared according to the following reaction:

To 750 cm³ of a normal NaOH solution containing 73 g (0.35 mole) of sodium hydrosulfite, there is added, little by little, with stirring and under a nitrogen atmosphere, 0.1 mole (28.4 g) of N-[(4'-amino-3',5'-dimethyl-2'-methoxy)phenyl] 2,6-dimethyl-benzoquinoneimine in solution in 300 cm³ of ethyl alcohol, while keeping the temperature of the reaction mixture in the vicinity of 30°C. When the reduction reaction is completed the reaction mass is rapidly filtered. The filtrate is cooled and neutralized with acetic acid. 27 g of the above diphenylamine leucoderivative is filtered which, after washing with water and drying under a vacuum, exhibits a melting point of 137°C.

Molecular mass calculated for $C_{17}H_{22}N_2O_2 = 286$.

Molecular mass found by potentiometric dosing in acetic acid by perchloric acid = 291.

| Analysis | Calculated for $C_{17}H_{22}N_2O_2$ | Found | |
|---|---|---|---|
| N% | 9.78 | 9.70 | 9.66 |

EXAMPLE 2

3,6-dimethyl-4-hydroxy-4'-amino-3',5'-dimethyl 2'-methoxy-diphenylamine is prepared according to the following reaction:

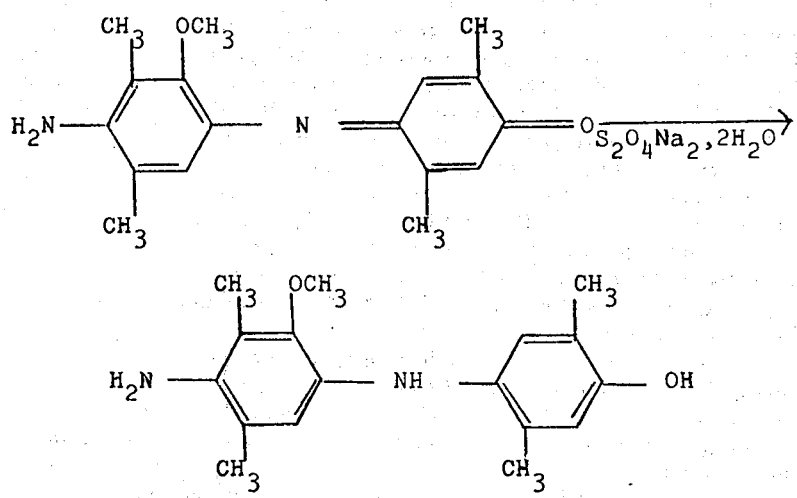

To 35 cm³ of a normal NaOH solution containing 3.5 g (0.016 mole) of sodium hydrosulfite, there is added, with stirring and under a nitrogen atmosphere, 0.005 mole (1.42 g) of N-[(4'-amino-3',5'-dimethyl-2'-

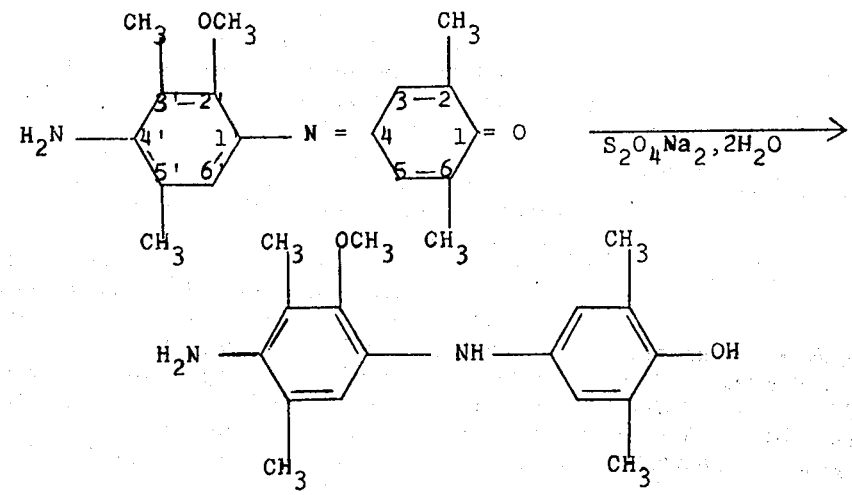

methoxy)phenyl]2,5-dimethyl-benzoquinoneimine in 15 cm³ of ethyl alcohol, while keeping the temperature of the reaction mixture in the vicinity of 30°C. When the reaction is finished, the mixture is neutralized with acetic acid and then filtered under a nitrogen atmosphere. 1.1 g of the above diphenylamine leucoderivative is obtained which, after washing in water and drying under a vacuum, exhibits a melting point of 110°C.

Molecular mass calculated for $C_{17}H_{22}N_2O_2 = 286$.

Molecular mass found by potentiometric dosage in acetic acid by perchloric acid = 290.

Molecular mass found by potentiometric dosage in methylisobutylketone by perchloric acid = 224.

| Analysis | Calculated for $C_{13}H_{15}N_3O$ | Found |
|---|---|---|
| N% | 18.34 | 18.62 – 18.42 |

EXAMPLE 4

2-acetylamino-4-hydroxy-5-methyl-4'-amino-2'-methoxy-5'-methyl-diphenylamine is prepared in accordance with the following reaction:

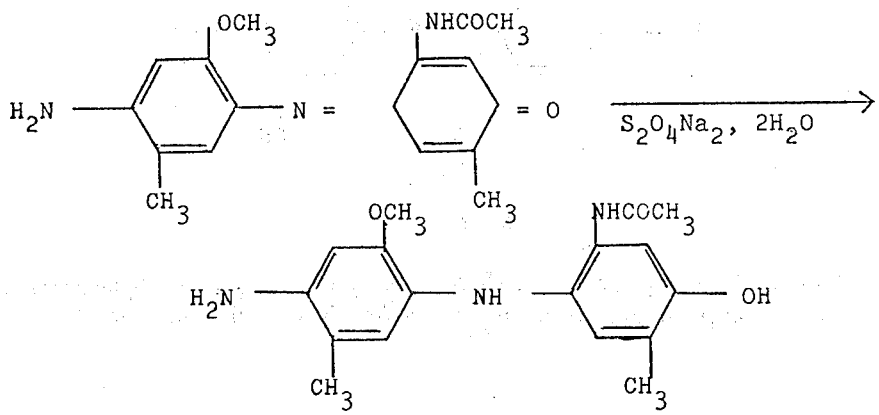

| Analysis | Calculated for $C_{17}H_{22}N_2O_2$ | Found | |
|---|---|---|---|
| N% | 9.78 | 9.79 | 9.78 |

EXAMPLE 3

2-amino-4-hydroxy-5-methyl-4'-amino-diphenylamine is prepared in accordance with the following reaction:

To 200 cm³ of a normal NaOH solution containing 0.1 mole (21 g) of sodium hydrosulfite there is added, little by little, with stirring and under a nitrogen atmosphere, 0.032 mole (9.5 g) of N-[(4'-amino-2'-methoxy-5'-methyl)phenyl] 3-acetylamino-6-methyl-benzoquinoneimine in solution in 50 cm³ of ethyl alcohol, while keeping the temperature of the reaction mixture in the vicinity of 30°C. When the reduction reaction is finished, acetic acid is added until a pH of about 7 is obtained. 8.8 g of the above diphenylamine

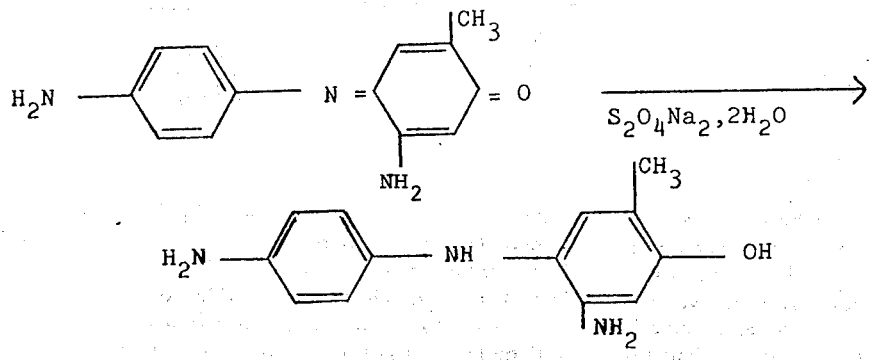

To 750 cm³ of a normal NaOH solution containing 0.47 mole (100 g) of sodium hydrosulfite there is added, little by little, with stirring and under a nitrogen atmosphere, 0.2 mole (45.4 g) of N-[(4'-amino)phenyl]5-amino-2-methyl-benzoquinoneimine in solution in 250 cm³ of ethyl alcohol, while keeping the temperature of the reaction mixture in the vicinity of 30°C. When the reduction is finished, acetic acid is added until a pH of about 7 is obtained. 44 g of the above diphenylamine leucoderivative is obtained and filtered under nitrogen. After washing the leucoderivative in water and drying it under a vacuum, it exhibited a melting point of 177°C.

Molecular mass calculated for $C_{13}H_{15}N_3O = 229$.

leucoderivative is filtered which, after washing in water and drying under a vacuum, exhibits a melting point of 233°C.

Molecular mass calculated for $C_{17}H_{21}N_3O_3 = 315$.

Molecular mass found by potentiometric dosage in acetic medium by perchloric acid = 322.

| Analysis | Calculated for $C_{17}H_{21}N_3O_3$ | Found | |
|---|---|---|---|
| N% | 13.33 | 13.17 | 13.24 |

EXAMPLE 5

The monohydrochloride, monohydrate of 2-amino-4-hydroxy-5-methyl-4'-hydroxy-diphenylamine is prepared in accordance with the following reaction:

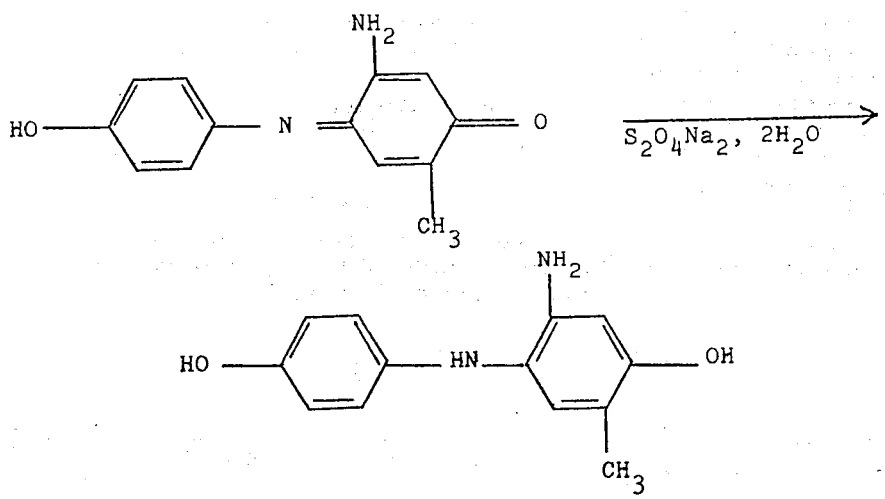

0.13 mole (30 g) of N-[(4'-hydroxy)phenyl] 5-amino-2-methyl-benzoquinoneimine is dissolved in a liter of 0.5N NaOH solution. Little by little, there is added thereto, with stirring and under a nitrogen atmosphere, 0.25 mole (52 g) of sodium hydrosulfite, while keeping the temperature of the mixture in the vicinity of 30°C. When the reduction is finished, acetic acid is added until a pH close to neutrality is obtained. The resulting leucoderivative is filtered under nitrogen and is carefully washed with water. It is then converted into 2-amino-4-hydroxy-5-methyl-4'-hydroxy-diphenylamine monohydrochloride, monohydrate by treatment with 2N hydrochloric acid. This product, after recrystallization in water, melts with decomposition at 144°C.

Molecular mass calculated for $C_{13}H_{14}N_2O_2$, HCL, $H_2O$ = 284.5.

Molecular mass found by potentiometeric dosage in an aqueous medium with a soda solution = 283.

EXAMPLE 6

2-amino-4-hydroxy-5-methyl-3',5'-dimethyl-4'-hydroxy-diphenylamine is prepared in accordance with the following reaction:

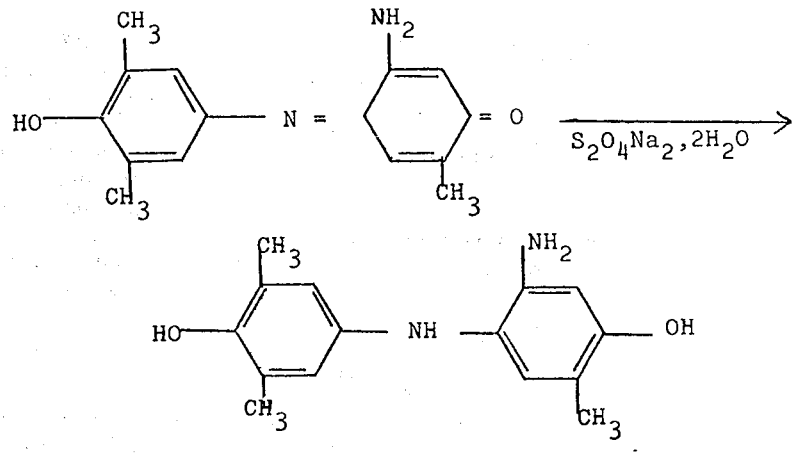

0.01 mole (2.56 g) of N-[4'-hydroxy-3',5'-dimethyl)phenyl]5-amino-2-methyl-benzoquinoneimine is dissolved in 75 cm³ of 0.5N NaOH solution. There is then added thereto, little by little, with stirring and under a nitrogen atmosphere, 0.02 mole (4.2 g) of sodium hydrosulfite. When the reduction reaction is finished, acetic acid is added in amounts sufficient to lower the pH to about 6. The resulting above leucoderivative is filtered and washed with water and then dried under a vacuum. After recrystallization in benzene, it exhibited a melting point of 167°C.

Molecular mass calculated for $C_{15}H_{18}N_2O_3$ = 258.

Molecular mass found by potentiometric dosage in methylisobutylketone by perchloric acid = 263.

| Analysis | Calculated for $C_{15}H_{18}N_2O_3$ | Found |
|---|---|---|
| N% | 10.85 | 10.97 – 11.04 |

EXAMPLE 7

A hair dye composition is prepared as follows:

| The diphenylamine leucoderivative of Example 3 | 0.15 g |
|---|---|
| Hydroxyethylcellulose | 2 g |
| Triethanolamine sufficient for | pH 10 |
| Water sufficient for | 100 g |

Gray hair is impregnated with this hair dye composition and after 20 minutes exposure to the air, the hair is rinsed, then shampooed. A gray coloring with lilac glints is imparted thereto.

EXAMPLE 8

A hair dye composition is prepared as follows:

| The diphenylamine leucoderivative of Example 2 | 0.05 g |
|---|---|
| Hydroxyethylcellulose | 2 g |
| Triethanolamine sufficient for | pH 10 |
| Water sufficient for | 100 g |

Bleached hair is impregnated with this hair dye composition and after 20 minutes exposure to the air, followed by rinsing and shampooing, a periwinkle blue coloring is imparted thereto.

EXAMPLE 9

The following hair dye composition is prepared:

| The diphenylamine leucoderivative of Example 5 | 0.2 g |
|---|---|
| Ethylene diamine tetraacetic acid | 0.3 g |
| Ammonium thioglycolate | 0.5 g |
| Ammonia sufficient for | pH 8 |
| Water sufficient for | 100 g |

Gray hair is impregnated with this hair dye composition and after 20 minutes exposure to the air, the hair is rinsed and shampooed. A very clear chestnut coloring is imparted thereto.

EXAMPLE 10

A hair dye composition is prepared as follows:

| The diphenylamine leucoderivative of Example 1 | 0.03 g |
|---|---|
| Hydroxyethylcellulose | 2 g |
| Triethanolamine sufficient for | pH 10 |
| Water sufficient for | 100 g |

Bleached hair is impregnated with this hair dye composition and after twenty minutes exposure to the air, the hair is rinsed and then shampooed. A platinum coloring with blue glints is imparted thereto.

EXAMPLE 11

A hair dye composition is prepared as follows:

| The diphenylamine leucoderivative of Example 6 | 0.2 g |
|---|---|
| Hydroxyethylcellulose | 2 g |
| Triethanolamine sufficient for | pH 9 |
| Water sufficient for | 100 g |

Bleached hair is impregnated with this hair dye composition and after twenty minutes exposure to the air, the hair is rinsed and then shampooed. A clear golden copper coloring is imparted thereto.

EXAMPLE 12

A hair dye composition is prepared as follows:

| The diphenylamine leucoderivative of Example 5 | 0.4 g |
|---|---|
| N,N-4-dimethylamine-2'-4'-diamino-5'-methyl-diphenylamine trihydrochloride, monohydrate | 0.1 g |
| Ammonia sufficient for | pH 11 |
| Water sufficient for | 100 cm$^3$ |

Gray hair is impregnated with this hair dye composition and after twenty minutes exposure to the air, the hair is rinsed and then shampooed. A frosted chestnut coloring is imparted thereto.

EXAMPLE 13

A hair dye composition is prepared as follows:

| The diphenylamine leucoderivative of Example 4 | 0.04 g |
|---|---|
| 4-hydroxy-2',4'-diamino-5'-methoxy-diphenylamine dihydrochloride, monohydrate | 0.06 g |
| Ammonia sufficient for | pH 11 |
| Water sufficient for | 100 g |

Gray hair is impregnated with this hair dye composition and after twenty minutes exposure to the air, followed by rinsing and shampooing, a very clear plum coloring with iridescent glints is obtained.

EXAMPLE 14

A hair-setting lotion is prepared as follows:

| The diphenylamine leucoderivative of Example 6 | 0.1 g |
|---|---|
| Crotonic acid-vinyl acetate copolymer | 2 g |
| Ethanol, 95° titer sufficient for | 50° |
| Triethanolamine sufficient for | pH 9 |
| Water sufficent for | 100 g |

This composition applied as a hair-setting solution to bleached hair, gives it a tea rose shade.

EXAMPLE 15

A hair-setting solution is prepared as follows:

| The diphenylamine leucoderivative of Example 6 | 0.08 g |
|---|---|
| 4-hydroxy-N,N-4'-dimethylamino-diphenylamine | 0.02 g |
| Crotonic acid-vinyl acetate copolymer | 2 g |
| Ethanol, 95° titer, sufficient for | 50° |
| Triethanolamine sufficient for | pH 9 |
| Water sufficient for | 100 g |

This composition, applied as a hair-setting lotion to bleached hair, gives it a very clear copper shade.

EXAMPLE 16

A hair-setting lotion is prepared as follows:

| The diphenylamine leucoderivative of Example 3 | 0.1 g |
|---|---|
| Crotonic acid-vinyl acetate copolymer | 2 g |
| Ethanol, 95° titer, sufficient for | 50° |
| Triethanolamine sufficient for | pH 9 |
| Water sufficient for | 100 g |

This composition, applied as a hair-setting lotion to bleached hair, gives it a clear violet shade.

EXAMPLE 17

A hair-setting lotion is prepared as follows:

| The diphenylamine leucoderivative of Example 3 | 0.05 g |
|---|---|
| Crotonic acid-vinyl acetate copolymer | 2 g |
| Ethanol, 95° titer sufficient for | 50° |
| Triethanolamine sufficient for | pH 9 |
| Water sufficient for | 100 g |

This composition, applied to gray hair as a hair-setting lotion, gives it a beige coloring with violet glints.

EXAMPLE 18

A hair-setting lotion is prepared as follows:

| | |
|---|---|
| The diphenylamine leucoderivative of Example 3 | 0.05 g |
| Crotonic acid-vinyl acetate copolymer | 2 g |
| Ethanol, 95° titer, sufficient for | 50° |
| Triethanolamine sufficient for | pH 7 |
| Water sufficient for | 100 g |

This composition, applied as a hair-setting lotion to bleached hair, gives it a clear beige shade with salmon glints.

EXAMPLE 19

A hair-setting lotion is prepared as follows:

| | |
|---|---|
| The diphenylamine leucoderivative of Example 4 | 0.05 g |
| Crotonic acid-vinyl acetate copolymer | 2 g |
| Ethanol, 95° titer, sufficient for | 50° |
| Triethanolamine sufficient for | pH 7 |
| Water sufficient for | 100 g |

This composition, applied to bleached hair as a hair-setting lotion, gives it a clear silvered gray shade.

EXAMPLE 20

A hair-setting lotion is prepared as follows:

| | |
|---|---|
| The diphenylamine leucoderivative of Example 4 | 0.025 g |
| 4-hydroxy-2′,4′-diamino-5′-methoxy-diphenylamine trihydrochloride, monohydrate | 0.025 g |
| Crotonic acid-vinyl acetate copolymer | 2 g |
| Ethanol, 95° titer, sufficient for | 50° |
| Triethanolamine sufficient for | pH 9 |
| Water sufficient for | 100 g |

This composition, applied to bleached hair as a hair-setting lotion, gives it a clear beige shade with pearl glints.

EXAMPLE 21

A hair-setting lotion is prepared as follows:

| | |
|---|---|
| The diphenylamine leucoderivative of Example 4 | 0.025 g |
| 4,4′-dihydroxy-3,5-dimethyl-diphenylamine | 0.025 g |
| Crotonic acid-vinyl acetate copolymer | 2 g |
| Ethanol, 95° titer, sufficient for | 50° |
| Triethanolamine sufficient for | pH 7 |
| Water sufficient for | 100 g |

This composition, applied to bleached hair as a hair-setting lotion, gives it a very clear blond shade with pearl glints.

EXAMPLE 22

A hair dye composition is prepared as follows:

| | |
|---|---|
| The diphenylamine leucoderivative of Example 3 | 0.1 g |
| Sodium laurylsulfate with 20% oxyethylenated lauryl alcohol | 20 g |
| Ethylene diamine tetraacetic acid | 2 g |
| Ammonia sufficient for | pH 10.5 |
| Water sufficient for | 100 g |

Bleached hair is impregnated with this hair dye solution. After 20 minutes of exposure to the air, the hair is rinsed, then shampooed. A cyclamen shade is obtained.

EXAMPLE 23

A hair-setting lotion is prepared as follows:

| | |
|---|---|
| The diphenylamine leucoderivative of Example 1 | 0.05 g |
| Crotonic acid-vinyl acetate copolymer | 2 g |
| Ethanol, 95° titer, sufficient for | 50° |
| Triethanolamine sufficient for | pH 9 |
| Water sufficient for | 100 g |

This composition, applied to bleached hair as a hair-setting lotion gives it a silver gray shade with lavender glints.

EXAMPLE 24

A hair-setting lotion is prepared as follows:

| | |
|---|---|
| The diphenylamine leucoderivative of Example 2 | 0.05 g |
| Crotonic acid-vinyl acetate copolymer | 2 g |
| Ethanol, 95° titer, sufficient for | 50° |
| Triethanoalmine sufficient for | pH 9 |
| Water sufficient for | 100 g |

This composition, applied to bleached hair as a hair-setting lotion, gives it a gray tint with blue green glints.

EXAMPLE 25

A hair-setting lotion is prepared as follows:

| | |
|---|---|
| The diphenylamine leucoderivative of Example 6 | 0.02 g |
| Crotonic acid-vinyl acetate copolymer | 2 g |
| Ethanol, 95° titer, sufficient for | 50° |
| Triethanolamine sufficient for | pH 9 |
| Water sufficient for | 100 g |

This composition, applied to bleached hair as a hair-setting lotion, gives it a golden apricot tint.

EXAMPLE 26

A hair dye composition is prepared as follows:

| | |
|---|---|
| The diphenylamine leucoderivative of Example 2 | 0.1 g |
| Hydroxyethylcellulose | 1 g |
| Triethanolamine sufficient for | pH 10 |
| 20 volume hydrogen peroxide | 50 cm$^3$ |
| Water sufficient for | 100 g |

Gray hair is impregnated with this hair dye composition and after 20 minutes the hair is rinsed and then shampooed. A slate gray coloring is imparted thereto.

EXAMPLE 27

A hair dye composition is prepared as follows:

| | |
|---|---|
| The diphenylamine leucoderivative of Example 6 | 0.025 g |
| 4-hydroxy-N,N-4′-dimethylamino-diphenylamine | 0.1 g |
| Hydroxyethylcellulose | 1 g |
| Triethanolamine sufficient for | pH 10 |
| 20 volume hydrogen peroxide | 50 cm$^3$ |
| Water sufficient for | 100 g |

Gray hair is impregnated with this hair dye composition and after 20 minutes the hair is rinsed and then shampooed. A verdigris shade is imparted thereto.

What is claimed is:

1. A keratinous fiber dyeing composition consisting essentially of an aqueous solution of a member selected from the group consisting of (a) a diphenylamine of the formula

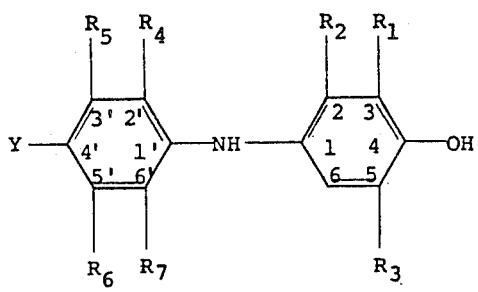
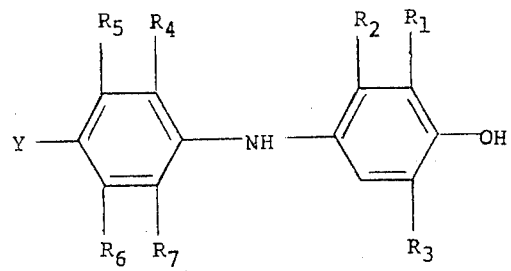

wherein Y represents a member selected from the group consisting of hydroxy and amino, $R_1$ and $R_3$, each independently, represent a member selected from the group consisting of hydrogen, halogen, lower alkyl containing 1–4 carbon atoms, lower alkoxy containing 1–4 carbon atoms, a ureido residue and —NHCOR wherein R represents lower alkyl containing 1–4 carbon atoms, $R_2$ represents a member selected from the group consisting of hydrogen, halogen, lower alkyl containing 1–4 carbon atoms, lower alkoxy containing 1–4 carbon atoms, a ureido residue —NHCOR wherein R represents lower alkyl containing 1–4 carbon atoms and -$NHR_8$ wherein $R_8$ represents a member selected from the group consisting of hydrogen, lower alkyl containing 1–4 carbon atoms, lower hydroxy alkyl containing 1–4 carbon atoms and carbamylmethyl, with the proviso that when $R_2$ is —$NHR_8$, $R_3$ is not hydrogen, $R_4$, $R_5$, $R_6$ and $R_7$ each represent a member selected from the group consisting of hydrogen, halogen, lower alkyl containing 1–4 carbon atoms and lower alkoxy containing 1–4 carbon atoms, with the proviso that when Y is hydroxy, $R_2$ is not hydrogen, halogen, lower alkyl containing 1–4 carbon atoms or lower alkoxy containing 1–4 carbon atoms, and that when Y is amino, at least two of $R_1$, $R_2$ and $R_3$ are other than hydrogen and $R_2$ is not hydrogen when $R_4$, $R_5$, $R_6$ and $R_7$ are all hydrogen; and (b) the hydrochloride of the diphenylamine of (a), said diphenylamine being present in amounts of 0.01 to 0.1 percent by weight of said composition and said composition having a pH between 7 and 10.

2. The composition of claim 1 wherein the diphenylamine is selected from the group consisting of
 1. 3,5-dimethyl-4-hydroxy-4'-amino-3',5'-dimethyl-2'-methoxy-diphenylamine;
 2. 3,6-dimethyl-4-hydroxy-4'-amino-3',5'-dimethyl-2'-methoxy-diphenylamine;
 3. 2-amino-4-hydroxy-5-methyl-4'-amino-diphenylamine:
 4. 2-acetylamino-4-hydroxy-5-methyl-4'-amino-2'-methoxy-5'-methyl-diphenylamine;
 5. the monohydrochloride, monohydrate of 2-amino-4-hydroxy-5-methyl-4'-hydroxy-diphenylamine; and
 6. 2-amino-4-hydroxy-5-methyl-3',5'-dimethyl-4'-hydroxy-diphenylamine.

3. A hair-setting lotion composition consisting essentially of an aqueous solution of a lower alkanol present in amounts ranging from about 20 to 50 percent by weight of said composition, a film-forming resin and a member selected from the group consisting of (a) a diphenylamine of the formula wherein Y represents a member selected from the group consisting of hydroxy and amino, $R_1$ and $R_3$, each independently, represent a member selected from the group consisting of hydrogen, halogen, lower alkyl containing 1–4 carbon atoms, lower alkoxy containing 1–4 carbon atoms, a ureido residue and —NHCOR wherein R represents lower alkyl containing 1–4 carbon atoms, $R_2$ represents a member selected from the group consisting of hydrogen, halogen, lower alkyl containing 1–4 carbon atoms, lower alkoxy containing 1–4 carbon atoms, a ureido residue and —NHCOR wherein R represents lower alkyl containing 1–4 carbon atoms and —$NHR_8$ wherein $R_8$ represents a member selected from the group consisting of hydrogen, lower alkyl containing 1–4 carbon atoms, lower hydroxy alkyl containing 1–4 carbon atoms and carbamylmethyl, $R_4$, $R_5$, $R_6$ and $R_7$ each represent a member selected from the group consisting of hydrogen, halogen, lower alkyl containing 1–4 carbon atoms and lower alkoxy containing 1–4 carbon atoms and (b) the hydrochloride of the diphenylamine of (a), said diphenylamine being present in amounts of 0.01 to 0.1% by weight of the total composition, said film forming resin being selected from the group consisting of polyvinylpyrrolidone having a molecular weight ranging from about 10,000 to 700,000 and copolymer of vinylpyrrolidone-vinyl acetate wherein the ratio of VP to VA ranges between 50–70:50–30 and being present in amounts of 1–3% by weight of said composition and said composition having a pH between 7 and 10.

4. The composition of claim 3 wherein the pH ranges between 7–9.

5. The composition of claim 3 wherein the lower alkanol is selected from the group consisting of ethanol and isopropanol.

6. The composition of claim 3 wherein the diphenylamine is selected from the group consisting of
 1. 3,5-dimethyl-4-hydroxy-4'-amino-3',5'-dimethyl-2'-methoxy-diphenylamine;
 2. 3,6-dimethyl-4-hydroxy-4'-amino-3',5'-dimethyl-2'-methoxy-diphenylamine;
 3. 2-amino-4-hydroxy-5-methyl-4'-amino-diphenylamine;
 4. 2-acetylamino-4-hydroxy-5-methyl-4'-amino-2'-methoxy-5'-methyl-diphenylamine;
 5. the monohydrochloride, monohydrate of 2-amino-4-hydroxy-5-methyl-4'-hydroxy-diphenylamine; and
 6. 2-amino-4-hydroxy-5-methyl-3',5'-dimethyl-4'-hydroxy-diphenylamine.

* * * * *